United States Patent
Gersten

(10) Patent No.: US 9,169,853 B2
(45) Date of Patent: Oct. 27, 2015

(54) ARRANGEMENT FOR OIL-SUPPLY OF AN ADD-ON MODULE

(71) Applicant: ZF Friedrichshafen AG, Friedrichshafen (DE)

(72) Inventor: Rayk Gersten, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 290 days.

(21) Appl. No.: 13/848,173

(22) Filed: Mar. 21, 2013

(65) Prior Publication Data

US 2013/0247550 A1 Sep. 26, 2013

(30) Foreign Application Priority Data

Mar. 26, 2012 (DE) .......................... 10 2012 204 773

(51) Int. Cl.
| | | |
|---|---|---|
| *F15B 15/00* | (2006.01) | |
| *F16H 57/04* | (2010.01) | |
| *F16H 57/02* | (2012.01) | |

(52) U.S. Cl.
CPC .............. *F15B 15/00* (2013.01); *F16H 57/043* (2013.01); *F16H 57/0471* (2013.01); *F16H 2057/02013* (2013.01)

(58) Field of Classification Search
CPC ........... F16B 15/00; F16H 2057/02013; F16H 57/043; F16H 57/0471; F16H 57/0426
USPC ....................................................... 184/6.12
See application file for complete search history.

(56) References Cited

U.S. PATENT DOCUMENTS

| | | | | |
|---|---|---|---|---|
| 2,841,966 | A * | 7/1958 | Belden et al. .................. | 464/154 |
| 5,325,739 | A * | 7/1994 | Toyota et al. ............... | 74/606 R |
| 8,529,397 | B2 * | 9/2013 | Demtroder ..................... | 475/331 |
| 2001/0011616 | A1 * | 8/2001 | Kageyama et al. .......... | 184/6.12 |
| 2003/0064846 | A1 * | 4/2003 | Klemen et al. .................... | 475/5 |
| 2013/0292209 | A1 * | 11/2013 | Schell et al. ................ | 184/6.12 |

FOREIGN PATENT DOCUMENTS

| | | |
|---|---|---|
| DE | 2164534 B | 2/1973 |
| DE | 103 48 757 A1 | 5/2005 |
| DE | 10 2011 002 904 A1 | 7/2012 |

OTHER PUBLICATIONS

German Search Report Corresponding to DE 10 2012 204 773.5.

* cited by examiner

*Primary Examiner* — William E Dondero
*Assistant Examiner* — Robert T Reese
(74) *Attorney, Agent, or Firm* — Davis & Bujold, P.L.L.C.; Michael J. Bujold

(57) ABSTRACT

An arrangement of a basic transmission and an add-on module having a module housing. The basic transmission has a driveshaft with a central axial bore for the supply of a lubricating oil stream and the add-on module has a connecting shaft mounted in the module housing by way of at least one roller bearing. The driveshaft and the connecting shaft are connected to one another in a rotationally fixed manner by a plug-in connection, and the plug-in connection and the at least one roller bearing are supplied with lubricating oil, by way of the central axial bore of the driveshaft. The lubricating oil stream can be divided into at least two flow streams in such manner that a respective flow-stream can pass to the at least one roller bearing and to the plug-in connection.

12 Claims, 3 Drawing Sheets

ARRANGEMENT FOR OIL-SUPPLY OF AN ADD-ON MODULE

This application claims priority from German patent application serial no. 10 2012 204 773.5 filed Mar. 26, 2012.

FIELD OF THE INVENTION

The invention concerns an arrangement for supplying oil to an add-on module connected to a basic transmission, according to the object of the applicant's earlier application with file number 10 2011 002 904.4.

BACKGROUND OF THE INVENTION

In the applicant's earlier application with file number 10 2011 002 904.4, an add-on module connected with a basic transmission is disclosed, which is supplied with lubricating oil coming from the basic transmission, i.e. which is connected to the lubricating oil circuit of the basic transmission by means of an inflow line and a return line. The add-on module has a connecting shaft, which is mounted on one side in a housing of the module and on the other side by a plug-in connection to the input shaft or driveshaft of the basic transmission. The plug-in connection, designed in the form of drive gearing, and the roller bearing, are the two lubrication points which must essentially be supplied with lubricating oil. In the approach adopted by the earlier application it is provided that the two lubrication points are positioned one behind the other in the oil supply line so that oil flows first through the drive gearing and then through the bearing. By way of an axis-parallel return bore the oil is returned again to the area of the basic transmission. In the separation area between the transmission input shaft and the connecting shaft an oil transfer element is provided, which separates the oil inflow from the oil return.

SUMMARY OF THE INVENTION

The purpose of the present invention is to improve and develop further the object of the earlier application.

Accordingly it is provided that the stream of lubricating oil can be divided into two part-streams such that, respectively, one part-stream can be directed toward the at least one roller bearing and the other toward the plug-in connection. Thus, the oil stream supplied as a whole is divided in such manner that the two part-streams are connected in parallel and the two lubrication points are acted upon with lubricating oil in parallel. Already by virtue of this parallel arrangement the pressure drop is reduced, i.e. less energy is needed for supplying lubricating oil to the two lubrication points.

According to a preferred embodiment the first part-stream can be supplied in by way of an axial gap of the plug-in connection. The axial gap is located in the area of a separation point between the connecting shaft and the driveshaft, and delivers a radially directed oil supply outward until it passes into the drive gearing of the plug-in connection so that the lubricating oil can flow through the drive gearing in the axial direction and thereby lubricate it.

In a further preferred embodiment a second part-stream is supplied by way of a radial bore to the roller bearing. Thus, both lubrication points are acted upon in parallel and supplied from the same axial inflow line.

According to another preferred embodiment, the roller bearing is accommodated in a space which is sealed off from the outside by sealing elements, the space having an inflow-side area and an outflow-side area. The radial bore opens into the inflow-side area of the space and thus supplies the roller bearing with lubricating oil, which then leaves the space as leakage oil via the outflow-side area.

In a further preferred embodiment the separation point between the transmission input shaft and the connecting shaft is bridged by a connection and distribution element. This connection and distribution element projects on one side into an outflow-side area of the axial bore of the transmission input shaft and on the other side into an inflow-side area of the connection shaft; it forms on the one hand an outlet in the axial direction and on the other hand a bypass for a first part-stream, which passes into the axial gap. By designing and dimensioning the bypass aperture appropriately, the flow rate of the first part-stream, which lubricates the plug-in connection, can be controlled. The connection and distribution element is preferably tubular and can be fitted easily when the connecting shaft and the transmission input shaft are plugged together. In a preferred embodiment the bypass aperture is in the form of an annular gap.

According to a further preferred embodiment at least one substantially axis-parallel bore is formed in the connecting shaft, which on the inflow side is in flow connection with the outflow-side area of the aforesaid space. In this way the leakage oil emerging from the space can drain away through the at least one bore. If needs be, a plurality of bores can be distributed around the circumference. The total cross-section is adapted to produce the pressure drop desired, such that a sufficient pressure gradient is achieved.

According to a further preferred embodiment the basic transmission comprises an unpressurized oil space, meaning that this space is at atmospheric pressure, this oil space of the basic transmission being vented to the atmosphere. The leakage oil from the bearing and also from the plug-in connection is returned to this oil space in the basic transmission. Thus, the oil circuit for supplying oil to the add-on module is a closed circuit, with the oil coming in centrally by way of the axial bore and being returned, parallel to the axis, into the oil space of the basic transmission.

BRIEF DESCRIPTION OF THE DRAWINGS

An example embodiment of the invention is illustrated in the drawings and will be described in more detail below so that further features and/or advantages may emerge from the description and/or from the drawings, which show.

DETAILED DESCRIPTION OF THE PREFERRED EMBODIMENTS

Figure 1:
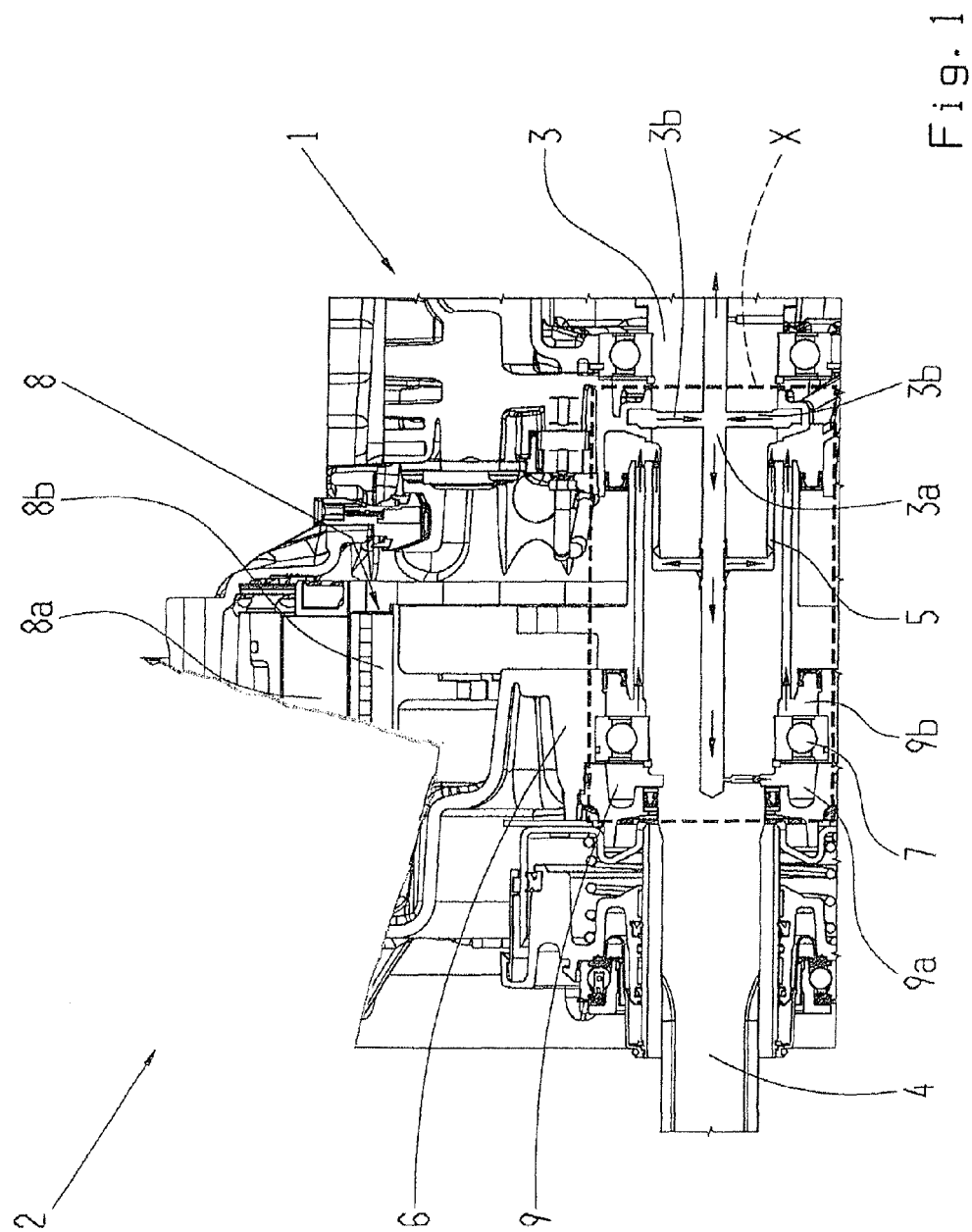
FIG. 1: An add-on module connected to a basic transmission.

FIG. 1 shows an arrangement comprising a partially represented basic transmission 1 and an add-on module 2, in this case designed as a so-termed hybrid module 2. The basic transmission 1 has a driveshaft or transmission input shaft 3 which is connected to a connecting shaft 4 of the add-on module 2 in a rotationally fixed manner by way of a plug-in connection 5. The add-on module 2 in the form of a hybrid module has a module housing 6 in which the connecting shaft 4 is supported by means of a roller bearing 7. The module housing 6 accommodates an electric machine 8 comprising a stator 8a and a rotor 8b. The rotor 8b is connected in a rotationally fixed manner to the connecting shaft 4, the connection means not being explained in any greater detail. The basic transmission 1, for example an automatic or manual-shift transmission, and the hybrid module 2 are incorporated in the drive-train of a motor vehicle. The basic transmission 1 has an oil supply system of its own whereas the add-on module 2 is connected to the oil supply system of the basic transmission 1. For this, a central axial bore 3*a* is provided in the driveshaft 3 of the basic transmission 1, which bore is connected by way of radial inflow ducts 3*b* to a source of lubricating oil. The flow direction is in each case indicated by flow arrows, not indexed further, in the ducts 3*b* and the axial bore 3*a*. The hybrid module 2 has essentially two lubrication points, namely on the one hand the plug-in connection 5 in the form of drive gearing, and the roller bearing 7 which is accommodated in a space 9, which has an inflow-side area 9*a* and an outflow-side area 9*b* and is sealed off from the outside by sealing elements (not indexed).

Figure 2:
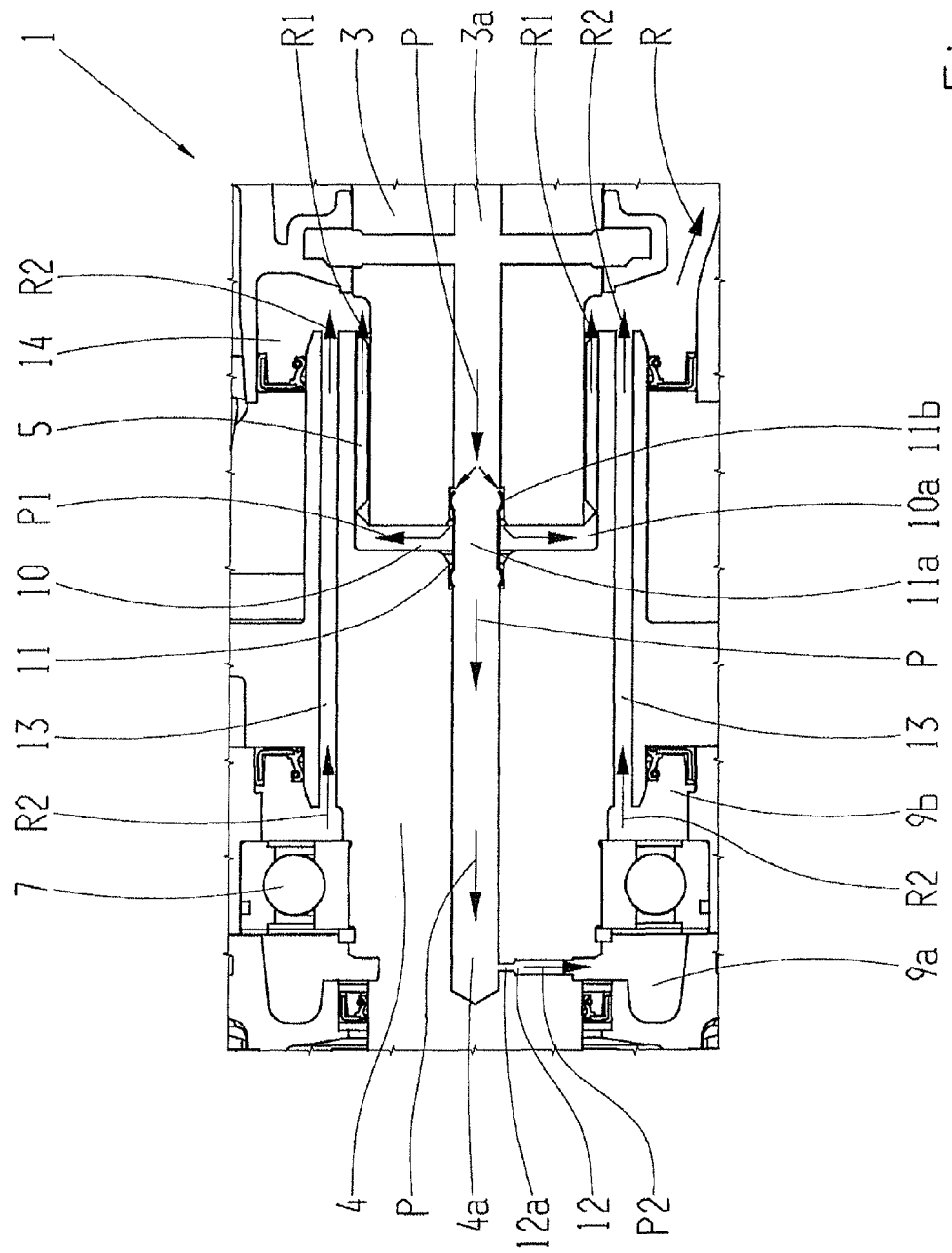
FIG. 2: A detail from FIG. 1, showing the oil supply system for the add-on module.

FIG. 2 shows the detail X in FIG. 1, the same indexes being used for the same components. Between the respective ends of the driveshaft 3 and the connection shaft 4, in the area of the plug-in connection 5, there is a separation point in the form of an axial gap 10. The axial gap 10 extends in the radial direction as far as an undercut 10*a* of the drive gearing of the plug-in connection 5, and so functions as a supply duct for the lubricating oil. In the connecting shaft 4, aligned with the axial bore 3*a* of the transmission input shaft 3, an axial bore 4*a* is provided in the form of a blind-hole bore extending as far as the inflow-side area 9*a* of the space 9. In the area of the axial gap 10, the two axial bores 3*a* and 4*a* are bridged by a connection and distribution element 11. The connection and distribution element 11 is tubular and projects on one side into the outflow-side area of the axial bore 3*a* and on the other side into the inflow-side area of the axial bore 4*a*, the inflow and outflow being indicated respectively by the flow arrows P. Thus, the connection and distribution element 11 has on one side an axial passage 11*a* and on the other side a bypass opening 11*b*, enabling a first part-stream to branch off as indicated by radially directed arrows P1, for lubricating the plug-in connection 5. The diverted volume flow, which flows outward through the axial gap 10, can be adjusted by appropriate design and dimensioning of the bypass opening 11*b* so as to ensure sufficient lubrication and cooling of the drive gearing 5. At the end of the blind bore 4*a* is formed a radial bore 12 with a throttle point 12*a*, which provides a flow connection between the axial bore 4*a* and the inflow-side area 9*a* of the space 9 for the roller bearing 7. Accordingly there is a second part-stream, as indicated by the arrow P2, for lubricating the roller bearing 7. Thus, the radially directed part-streams denoted by the arrows P1 and P2 are hydraulically connected in parallel. For the return of the lubricating oil from the outflow-side area 9*b* of the space 9, return bores 13 parallel to the axis are provided in the connecting shaft 4. The drawing shows two diametrically opposite return bores 13 but in principle one bore is sufficient, although a plurality of bores distributed around the circumference can also be provided. The lubricating oil emerging from the outflow-side area 9*b* of the space 9, also referred to as leakage oil, is indicated by arrows R2. The return bores 13 extend from the outflow-side area 9*b* to an annular space 14 in the housing of the basic transmission 1, which is connected by a duct denoted by an arrow R to an unpressurized oil space of the basic transmission 1. The oil space of the basic transmission 1 (not shown) is vented to the atmosphere. Into the annular space 14 there also flows the leakage oil emerging from the plug-in connection 5 in the axial direction, as indicated by arrows R1. Thus, as can be seen clearly from the drawing, the return flows from both lubrication points, namely the plug-in connection 5 and the roller bearing 7, pass in parallel into the annular space 14.

Figure 3:
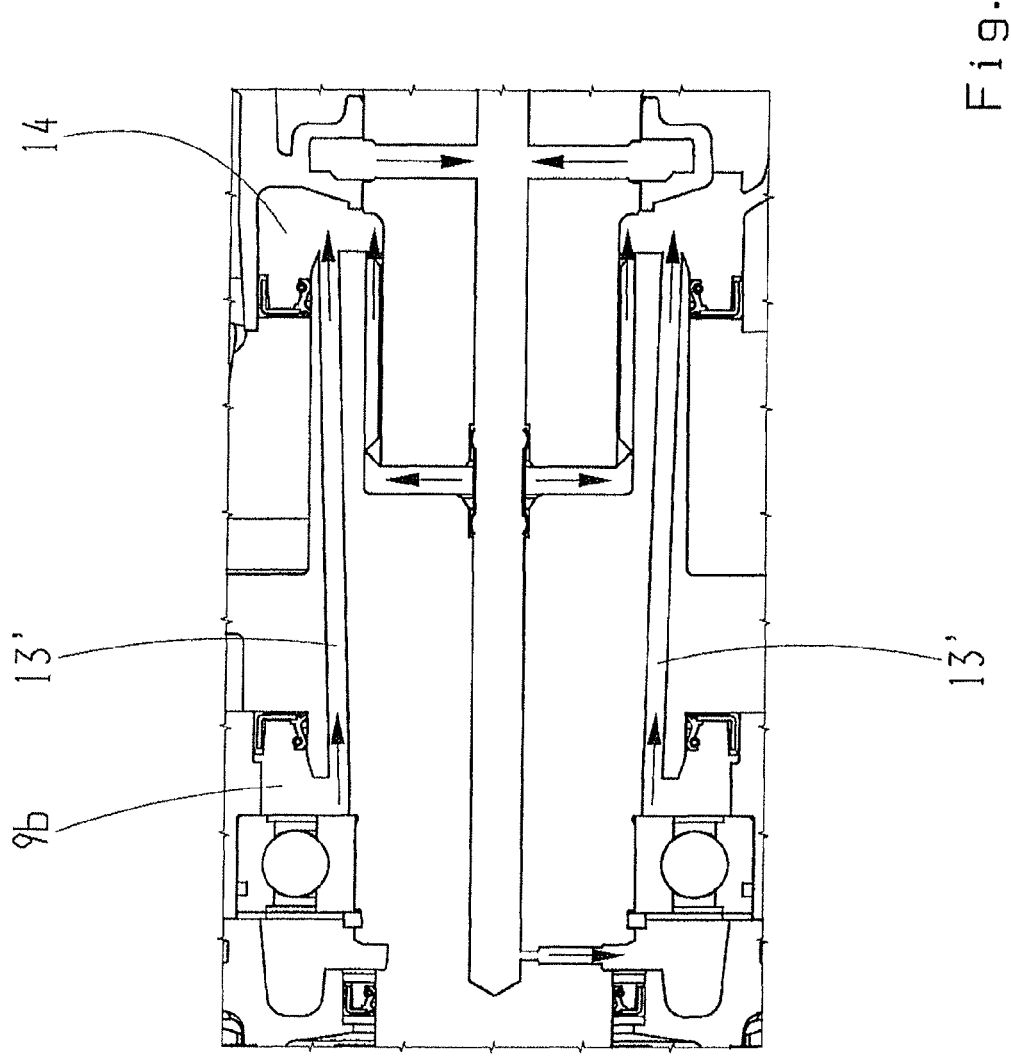
FIG. 3: A modified embodiment in which the return bores run obliquely.

FIG. 3 shows a modified embodiment, the difference consisting in the arrangement of the return bores 13 shown in FIG. 2. Whereas the return bores 13 in FIG. 2 are arranged parallel to the axis, the return bores indexed 13' in this case are inclined relative to the axis of the connecting shaft 4, so that their outlet openings into the annular space 14 are arranged on a larger diameter than the inflow openings in the region of the outflow-side area 9*b*. This improves the oil return flow since a suction effect is produced by virtue of centrifugal force.

INDEXES

1 Basic transmission
 2 Add-on module
 3 Driveshaft
 3*a* Axial bore
 3*b* Inflow duct
 4 Connecting shaft
 4*a* Axial bore
 5 Plug-in connection
 6 Module housing
 7 Roller bearing
 8 Electric machine
 8*a* Stator
 8*b* Rotor
 9 Space
 9*a* Inflow-side area
 9*b* Outflow-side area
10 Axial gap
10*a* Undercut
11 Connection and distribution element
11*a* Axial passage
11*b* Bypass
12 Radial bore
12*a* Throttle
13 Return bore
13' Return bore (oblique)
14 Annular space
P1 Flow arrow
P1 First part-stream (inflow)
P2 Second part-stream (inflow)
R Flow arrow (return flow)
R1 Flow arrow (return flow)
R2 Flow arrow (return flow)

The invention claimed is:

1. An arrangement of a basic transmission (1) and an add-on module (2) having a module housing (6), the basic transmission (1) comprising:
   a driveshaft (3) with a central first axial bore (3*a*) for supply of a stream of a lubricating oil,
   the add-on module (2) comprising a connecting shaft (4) mounted in the module housing (6) by at least one roller bearing (7),
   the driveshaft (3) and the connecting shaft (4) being connected to one another in a rotationally fixed manner by a plug-in connection (5) to rotate about an axis,
   the plug-in connection (5) and the at least one roller bearing (7) being supplied with lubricating oil by way of the central first axial bore (3*a*) of the driveshaft (3), and
   the lubricating oil stream flowing in a first axial direction is divided into at least first and second flow streams (P1, P2) in such manner that a respective flow stream (P1, P2) passes to the at least one roller bearing (7) and to the plug-in connection (5), and the connecting shaft having at least one return bore through which a return stream passes in a second axial direction opposite the first axial direction.

2. The arrangement according to claim 1, wherein a first flow stream (P1) passes by way of an axial gap (10) between the driveshaft (3) and the connecting shaft (4) of the plug-in connection (5).

3. The arrangement according to claim 1, wherein the connecting shaft (4) has a central, second axial bore (4a) that communicates with the central first axial bore (3a), and a second flow stream (P2) passes through the roller bearing (7) by way of at least one radial bore (12) that branches off from the central second axial bore (4a).

4. The arrangement according to claim 3, wherein the radial bore (12) has a throttle aperture (12a).

5. The arrangement according to claim 3, wherein the central first axial bore (3a) in the driveshaft (3) and the second axial bore (4a) in the connecting shaft (4) are connected to one another, in the area of the axial gap (10), by a connection and distribution element (11).

6. The arrangement according to claim 5, wherein the connection and distribution element (11) has an axial passage (11a), and a bypass aperture (11b) which is in flow connection with the axial gap (10).

7. The arrangement according to claim 1, wherein the roller bearing (7) is accommodated in a space (9) that is sealed by sealing elements and which has an inflow-side area (9a) and an outflow-side area (9b).

8. The arrangement according to claim 7, wherein the radial bore (12) opens into the inflow-side area (9a) of the space (9).

9. The arrangement according to claim 7, wherein the at least one return bore (13'), which is inclined relative to the axis and is in flow connection with the outflow-side area (9b) of the space (9), is located in the connecting shaft (4).

10. An arrangement of a basic transmission (1) and an add-on module (2) having a module housing (6), the basic transmission (1) comprising:
a driveshaft (3) with a central first axial bore (3a) for supply of a stream of a lubricating oil;
the add-on module (2) comprising a connecting shaft (4) mounted in the module housing (6) by at least one roller bearing (7);
the driveshaft (3) and the connecting shaft (4) being connected to one another in a rotationally fixed manner by a plug-in connection (5) to rotate about an axis;
the plug-in connection (5) and the at least one roller bearing (7) being supplied with lubricating oil by way of the central first axial bore (3a) of the driveshaft (3);
the lubricating oil stream being divided into at least first and second flow streams (P1, P2) in such manner that a respective flow stream (P1, P2) passes to the at least one roller bearing (7) and to the plug-in connection (5);
the roller bearing (7) is accommodated in a space (9) that is sealed by sealing elements and the space (9) has an inflow-side area (9a) and an outflow-side area (9b); and
at least one return bore (13), which runs parallel to the axis and is in flow connection with the outflow-side area (9b) of the space (9), is located in the connecting shaft (4).

11. The arrangement according to claim 10, wherein the basic transmission (1) comprises a substantially unpressurized oil space (14), and the at least one return bore (13, 13') is in flow connection with the oil space (14).

12. An arrangement of a basic transmission (1) and an add-on module (2) having a module housing (6), the basic transmission (1) comprising:
a driveshaft (3) defining a rotational axis,
the driveshaft having a central axial bore (3a) through which a lubricating oil stream of oil flows in a first axial direction and the add-on module (2) having a connecting shaft (4) which is rotationally supported, via at least one roller bearing, by the module housing (6),
the driveshaft (3) and the connecting shaft (4) being connected such that an end of the driveshaft is connected within an end of the connecting shaft in a rotationally fixed manner by a plug-in connection and the central axial bore of the driveshaft being coaxially aligned with a central axial bore of the connecting shaft,
the plug-in connection (5) and the at least one roller bearing (7) being supplied with lubricating oil by way of the central axial bore (3a) of the driveshaft (3),
the lubricating oil stream being divided into at least first and second flow streams (P1, P2) such that a first flow stream (P1) passes from the end of the driveshaft and axially along the plug-in connection and radially outward between the driveshaft and the connecting shaft and a second flow stream passes through the central axial bore of the connecting shaft in the first axial direction and radially outward to the at least one roller bearing and axially in a second axial direction, opposite the first axial direction, through a return bore in the connecting shaft, the central axial bores of the driveshaft and the connecting shaft being parallel to each other.

* * * * *